United States Patent [19]

Olek

[11] Patent Number: 4,729,126
[45] Date of Patent: Mar. 1, 1988

[54] METHOD AND APPARATUS FOR SUPERVISING THE ACCESSING AND TESTING OF COMMUNICATION SYSTEMS

[75] Inventor: David J. Olek, Victor, N.Y.

[73] Assignee: TII Computer Systems, Inc., Copiague, N.Y.

[21] Appl. No.: 926,871

[22] Filed: Nov. 4, 1986

Related U.S. Application Data

[63] Continuation of Ser. No. 645,478, Aug. 29, 1984, abandoned.

[51] Int. Cl.⁴ ............................................. H04B 3/46
[52] U.S. Cl. ..................................................... 379/22
[58] Field of Search ................. 379/22, 1, 34; 375/10; 371/22; 370/14

[56] References Cited

U.S. PATENT DOCUMENTS 3,969,594  7/1976  DeLuca et al. ..................... 379/22

Primary Examiner—Stafford D. Schreyer
Attorney, Agent, or Firm—Pennie & Edmonds

[57] ABSTRACT

An apparatus for accessing and testing communication systems and for controlling said accessing and testing. A microprocessor operates under software control to perform various supervisory and computational functions. Communications components permit the microprocessor to interface with components dedicated to the accessing and testing of telephone lines as well as with terminals and other computers.

8 Claims, 7 Drawing Figures

METHOD AND APPARATUS FOR SUPERVISING THE ACCESSING AND TESTING OF COMMUNICATION SYSTEMS

This is a continuation of application Ser. No. 06/645,478, filed Aug. 29, 1984, now abandoned.

CROSS-REFERENCE TO RELATED APPLICATIONS

Related applications, incorporated herein by reference, are "Method and Apparatus for Accessing Communication Systems", Ser. No. 645,875, "Method and Apparatus for Testing Communication Systems", Ser. No. 645,479, and "Method and Apparatus for Configurable Line Testing", Ser. No. 645,461 filed concurrently herewith and assigned to TII Computer Systems, Inc.

BACKGROUND OF THE INVENTION

This relates to the maintenance and testing of communication lines and, in particular, to the maintenance and testing of conventional telephone lines.

Communication lines require periodic testing, maintenance and repair. At first, telephone system operators employed an entirely manual process of accessing, testing and servicing subscriber lines. However, these manual procedures allowed inoperative lines to go undetected for long periods and frequently resulted in a substantial delay between the initial report of trouble on a line and the verification and identification of that trouble. Line trouble was often discovered only when a subscriber's service had been interrupted, and even after it was reported, a rapid, accurate and intelligent response to the trouble report or to a subsequent inquiry was impossible in the majority of circumstances. In addition, the speed and accuracy of certain line tests depended on the experience of the tester and upon how quickly information about the subscriber's telephone equipment could be manually retrieved from a file; and the whole process was very much labor intensive.

In an effort to acquire better line testing, maintenance and repair capabilities, in the 1970's American Telephone and Telegraph, Inc. developed and implemented Automatic Repair Service Bureaus (ARSBs) in the predecessors of the Regional Bell Operating Companies (RBOCs) See P. S. Boggs and M. W. Bowker, "Automated Repair Service Bureau: Evolution", *Bell System Technical Journal*, Volume 61, No. 6, Part 2, pp. 1097–1114 (July–August, 1982). The ARSBs utilized a Loop Maintenance Operating System (LMOS) and a Mechanized Loop Testing (MLT) system.

LMOS provides four basic services to the ARSBs. First, the system generates and maintains a data base containing very detailed information. Records in this data base, known as "line records," reflect such information as the telephone equipment in use at a subscriber's site, the electrical characteristics of this equipment, whether there are any unresolved reports of trouble on the line, and whether the subscriber's account shows an unpaid balance.

Second, LMOS performs computerized trouble report processing. When a trouble on a line is reported by a subscriber, an entry is made in the applicable line record. The telephone company employee receiving the subscriber's call can use the MLT system, described below, to perform some preliminary tests on the line and verify or discount the report. If the tests disclose no line trouble, the employee will inform the subscriber that the line is in working order and make an entry in the line record reflecting that fact. Alternatively, if the test results indicate that a trouble does exist, the employee's entry will indicate that further testing by MLT is required. Thus, LMOS allows the existence and status of a pending trouble report to be readily determined.

The third basic service provided by LMOS involves the generating of management and analysis reports by utilizing the information stored in its data base. These reports include analyses of the ARSBs' efficiency and the prediction and identification of problem areas in repair operations.

Finally, because LMOS keeps track of repair force locations and commitments, the system allows for efficient repair force deployment. This is particularly important when a subscriber is requested to remain at a site for repair operations. LMOS, as a provider of these services, clearly represents a material advance over prior manual record and report processing procedures.

An MLT system essentially performs computer controlled tests on the communication lines and interprets the results of those tests. The MLT system obtains information about the normal electrical characteristics of a subscriber's line from the LMOS database and uses it to generate a series of adaptive tests in order to determine the current status of the line. For example, the subscriber may use what is referred to as "inward-only" service, in which outgoing calls on the line are not permitted, and thus no dial tone is provided. There would be little point in running a test to detect a dial tone on such a line. In addition to information about the subscriber's termination equipment, LMOS also contains data describing central office equipment and outside— plant equipment on the line. This data is also required for meaningful MLT testing.

MLT accesses selected lines at and through communication test head hardware. The Test Head first ensures that the voltage on the line to be tested is not high enough to damage the testing equipment. Then, depending upon the manner in which a line is accessed, other preliminary tests may be performed to ascertain whether a given line is available for testing, including for example, whether the line is on intercept, or whether it is currently in use. If the line is available, MLT performs a series of diagnostic tests designed to determine the line's operational status. These tests typically include measurements of AC and DC voltage and current, resistance and capacitance measurements, dial tone detection, dial pulse and DTMF tests and noise checks. In addition, the MLT system can detect the existence of an open wire and determine the location of the break.

The MLT system then interprets the results of these tests in accordance with information acquired from the LMOS data base. Frequently, these results can be used to respond to a subscriber trouble report or inquiry while he is still on the line. In addition, a detailed analysis of the test results can be routed to repair service personnel to enable repair operations to be accomplished quickly and efficiently.

Because of cost and efficiency considerations, however, present implementations of the MLT systems are best suited for use only where the number of lines to be served exceeds 10,000. Each MLT currently relies extensively on the processing power of a single minicomputer, and failure of that machine results in a total failure of the MLT system.

SUMMARY OF INVENTION

The present invention is part of a method and apparatus for performing many of the same testing functions previously provided by devices such as the MLT system, but at significantly lower cost and in significantly smaller equipment. Such apparatus comprises three interacting units, a test trunk access (TTA) unit, used for accessing communication lines and for performing certain preliminary tests upon said lines, a testing unit for testing said lines, and a supervisor unit, used for controlling the TTA unit. In the presently preferred embodiment, both the TTA unit and the testing unit are interfaced to and controlled by the supervisor unit. The TTA unit is described in detail in the above-referenced application entitled "Method and Apparatus for Accessing Communication Systems", and the testing unit is described in the above-referenced application entitled "Method and Apparatus for Testing Communication Systems".

In an illustrative mode of operation, the supervisor unit of the invented apparatus determines which communication lines are to be tested, instructs the TTA unit to access these lines, and then causes the testing unit to test the lines and communicate the results back to the supervisor for storage and processing.

A plurality of cooperating TTA and testing units can be controlled by one supervisor unit. Furthermore, several independently functioning supervisor units, each having associated TTA and testing units, can be employed to service a large number of lines. Thus, one advantage of the present invention is that it permits a system architecture utilizing distributed intelligence, wherein the failure of one TTA or a testing unit will not prevent other such units from functioning, and the failure of one supervisor unit will not impair the operation of other supervisor units and their associated TTA and testing units.

The supervisor includes a central processing unit, a clock unit, a memory controlled by a memory management unit, memory and I/O decoding circuitry, a disk interface, serial communication interfaces, a timer, an I/O port and automatic dialing and modem devices. An operating system program executing on the supervisor hardware controls the unit and, through the communication interfaces, also controls the TTA and testing units.

Processing functions are performed by the central processing unit (CPU), which has full control over the supervisor hardware, and the clock unit, which has the capability to retain and update exact time, regardless of a power loss or interruption. This system architecture permits the CPU to continuously monitor and control the supervisor hardware and associated TTA and testing units with proper time of day configurations instead of having to interrupt normal operations when power is interrupted. The memory management unit (MMU) computes addresses which are used to access RAM and ROM memories. The supervisor can access a secondary storage device through the disk interface circuit, and can store and retrieve information about subscriber lines, telephone switching equipment, system status and testing results. Information can also be supplied to the supervisor, as well as received therefrom, using terminals or other computers interfaced with local ports or modems. In addition, control, counting and timing functions are provided by a combination counter/timer/IO port device.

The supervisor monitors and controls TTA and testing units through a synchronous communication port and can support additional I/O using asynchronous ports. Telephone lines are dialed by DTMF or dial pulse dialing circuitry and digital telecommunication can be accomplished using modems.

The software executing on the supervisor hardware permits line testing to proceed interactively or automatically. To perform interactive testing, an operator uses one of the asynchronous interfaces to submit various access and testing commands to the supervisor. Automatic line testing can be accomplished in two modes: ordinary automatic loop testing (ALT) and selective automatic loop testing (SALT). In SALT mode, a list of line numbers is input by an operator into the supervisor memory or is retained in secondary storage. The supervisor then proceeds to access and test all accessible lines in that list, and stores the results of the tests. Ordinary automatic loop testing (ALT) makes use of a stepper signal which, when applied by the TTA to telephone switching equipment after a line is dialed, permits the TTA unit to sequentially access a series of lines without having to redial each one.

The TTA unit includes a microcomputer, which comprises a microprocessor, memory, I/O components for communicating with the supervisor unit and an optional terminal device, and a decoder for generating control signals for various line access and testing circuitry. Control and status ports distribute and sample control and status signals within the unit. Likewise, the testing unit includes a microcomputer having a processor, memory and I/O for communicating with the supervisor unit as well as extensive testing circuitry for testing communication lines.

An additional advantage of the present invention that the supervisor, each TTA unit and each testing unit are capable of being contained on one circuit board, thus minimizing the size and complexity of the overall system while increasing its reliability and decreasing its cost.

BRIEF DESCRIPTION OF THE INVENTION

These and other objects, features and advantages of the invention will be more readily apparent from the following detailed description of the preferred embodiment of the invention in which:

FIG. 2 shows memory I/O decoding circuitry, RAM and ROM memories and a disk interface circuit;

Figure 5:
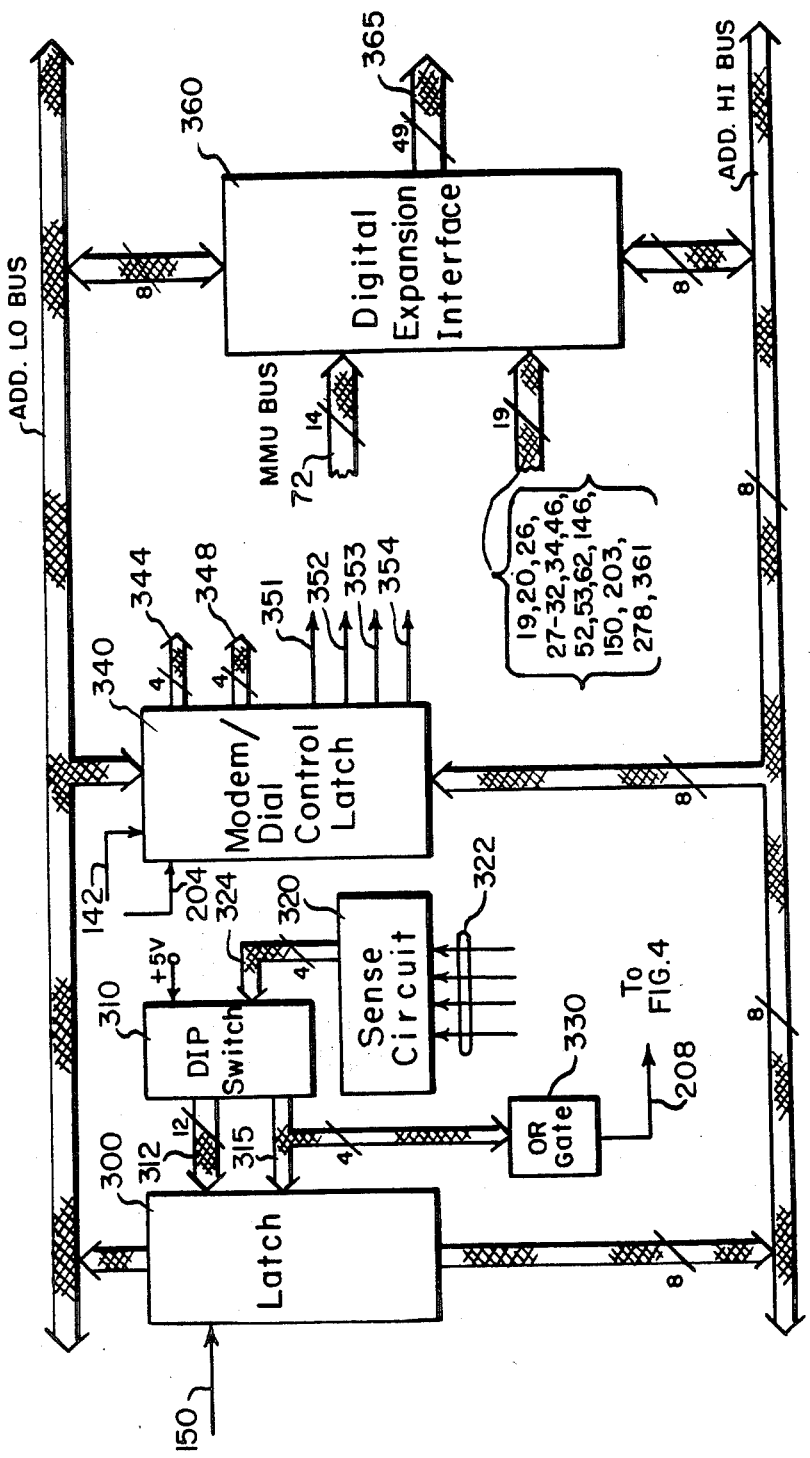
Figure 6:
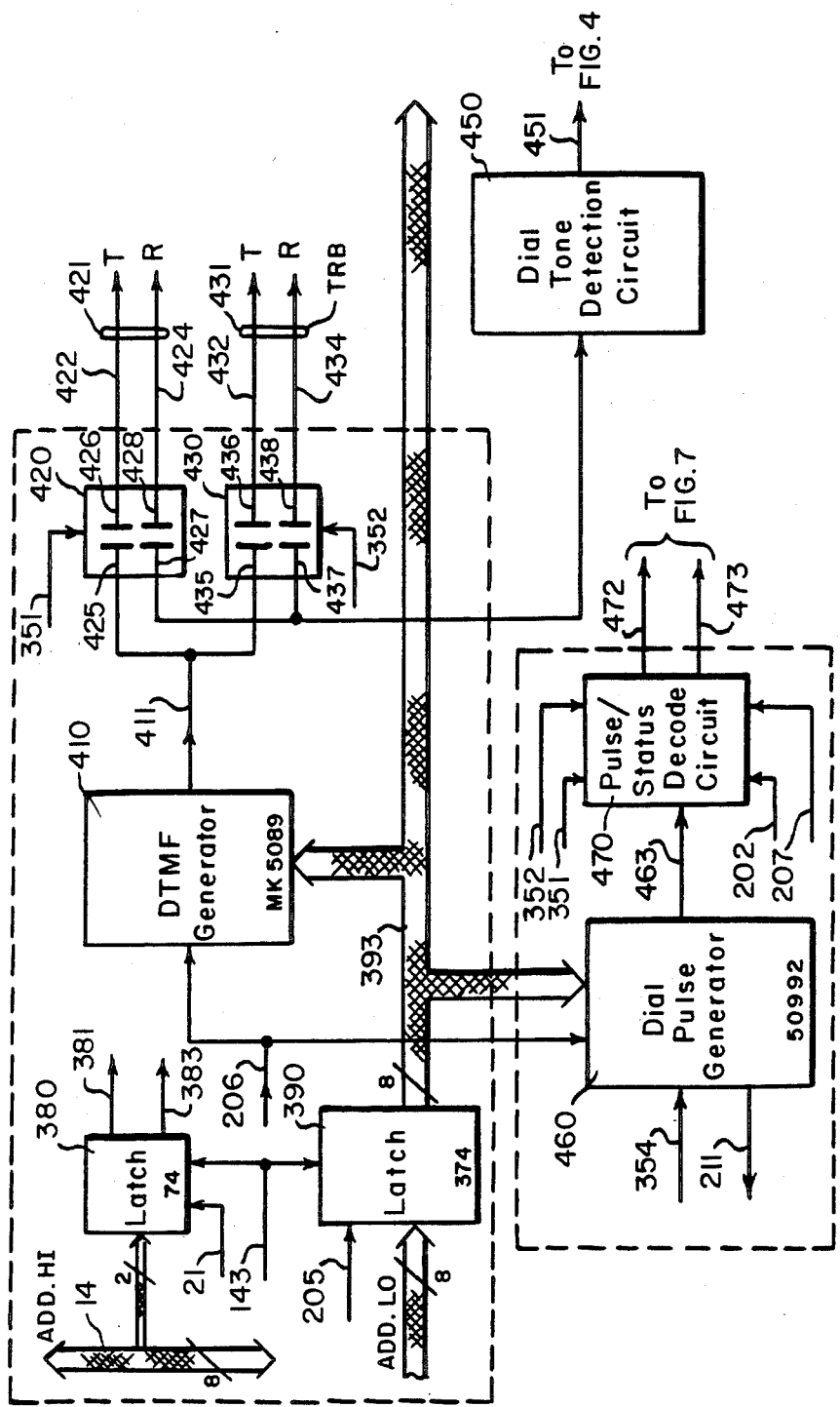
Figure 7:
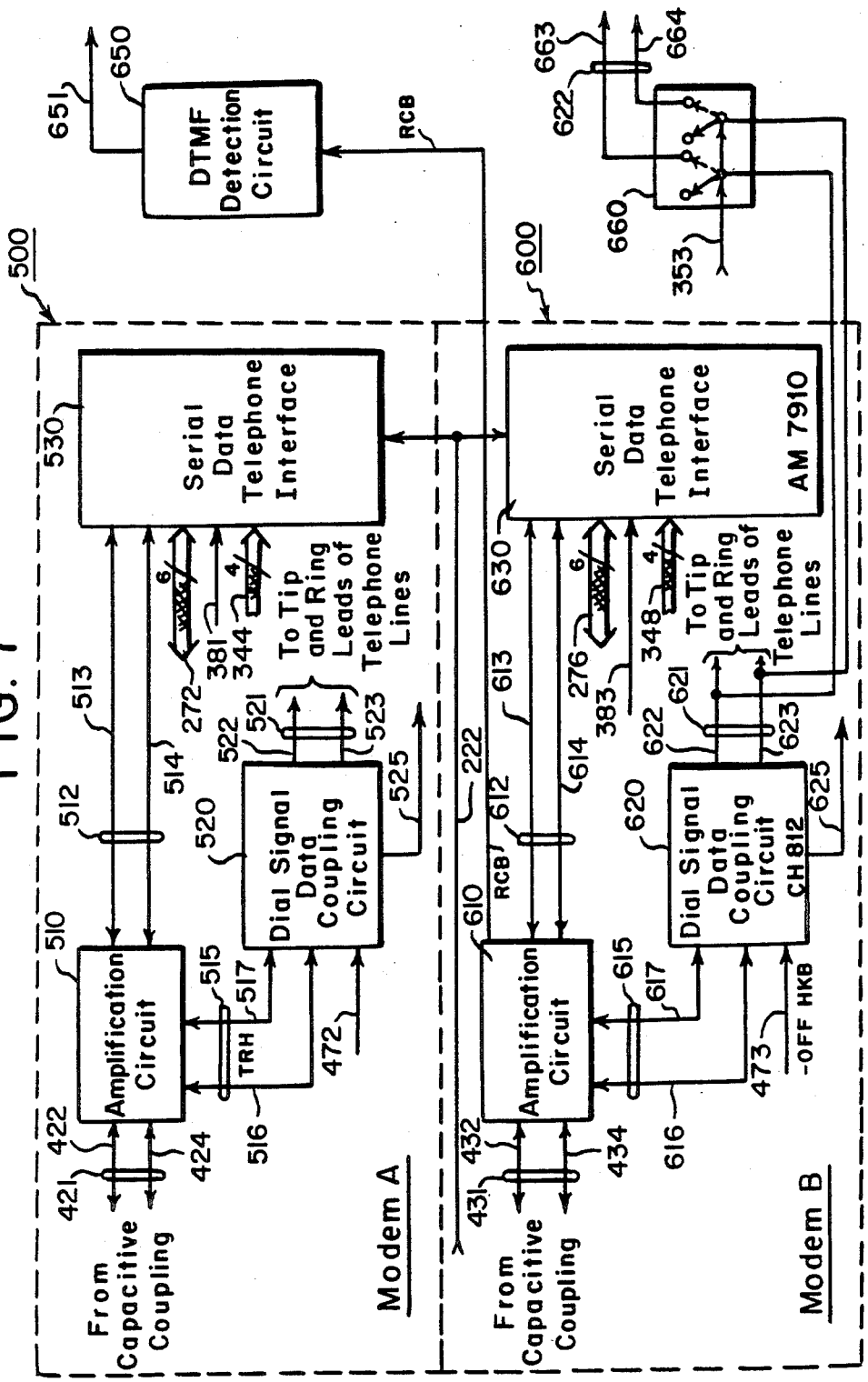

FIG. 5 portrays circuitry for status and switch position detection, a modem control latch and a digital expansion interface;

FIG. 6 depicts control ports, autodialing circuitry, capacitive coupling means and dial tone detection circuitry; and FIG. 7 shows modems "A" and "B" and a relay to make a metallic coupling.

DETAILED DESCRIPTION OF THE PREFERRED EMBODIMENT

Figure 1:
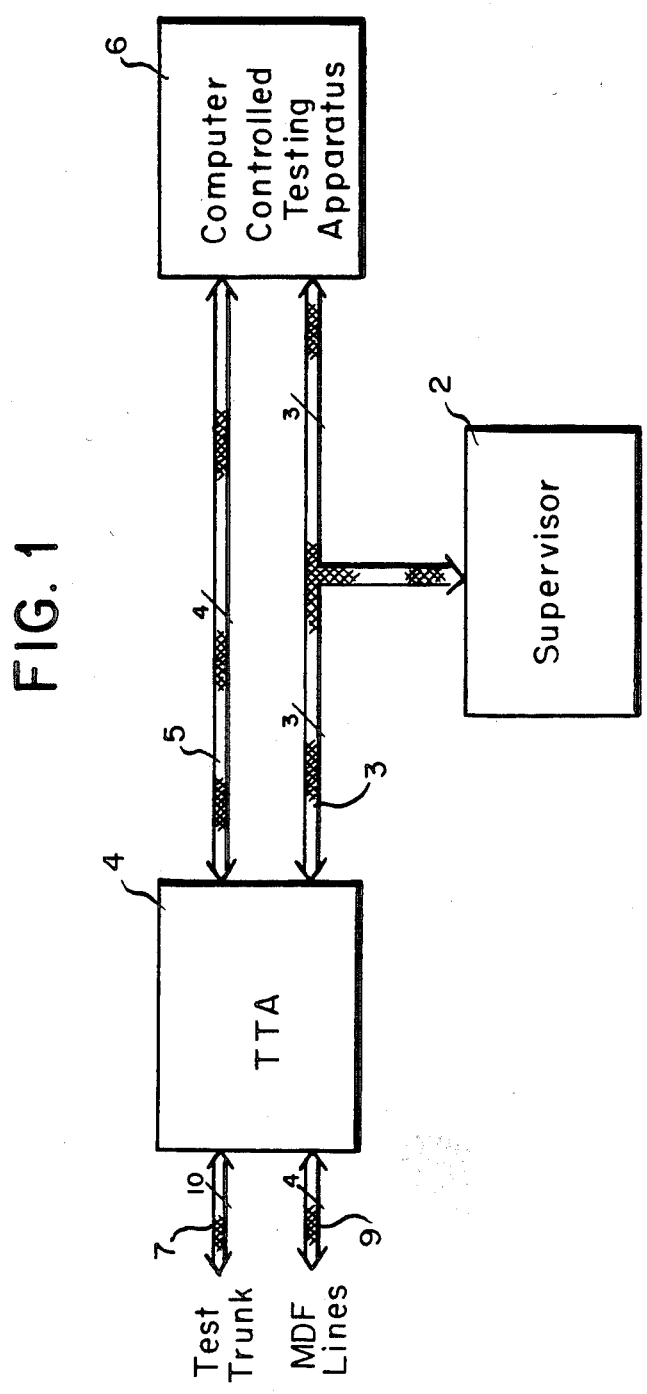
FIG. 1 is a block diagram showing the presently preferred embodiment of the invented apparatus, comprising the supervisor and test trunk access units, in use with a testing unit.

As shown in FIG. 1, a complete system for maintenance and testing of communication lines comprises a supervisor unit 2, a test trunk access (TTA) unit 4 and a testing unit 6. The supervisor is connected to the testing unit and to the TTA by a serial synchronous interface using a three-wire line 3. The TTA unit is connected to the testing unit by a four-wire line 5. When a given set of communication lines are to be tested, the supervisor unit uses line 3 to instruct the TTA to access the lines using ten-wire test trunk 7 or four-wire MDF interface line 9. The TTA may then perform preliminary tests, described below, in order to determine whether access to the lines can be obtained using the access means selected.

Assuming access is permissible, the TTA siezes the lines through either test trunk 7 or MDF line 9 and couples said lines to line 5. The TTA then informs the supervisor that a successful line seizure has occurred. The supervisor, through three-wire line 3, then instructs the testing unit to test the seized lines using line 5. When testing is completed, the TTA apparatus notifies the supervisor unit and transmits the test results to said unit over line 3. The supervisor then performs any additional computations required to determine communication line characteristics. Details of the supervisor unit are discussed immediately below. Details of the TTA unit are discussed in the above-referenced application "Method and Apparatus for Accessing Communication Systems". The testing unit and testing method are described in the above-referenced application "Method and Apparatus for Testing Communication Systems".

Figure 2:
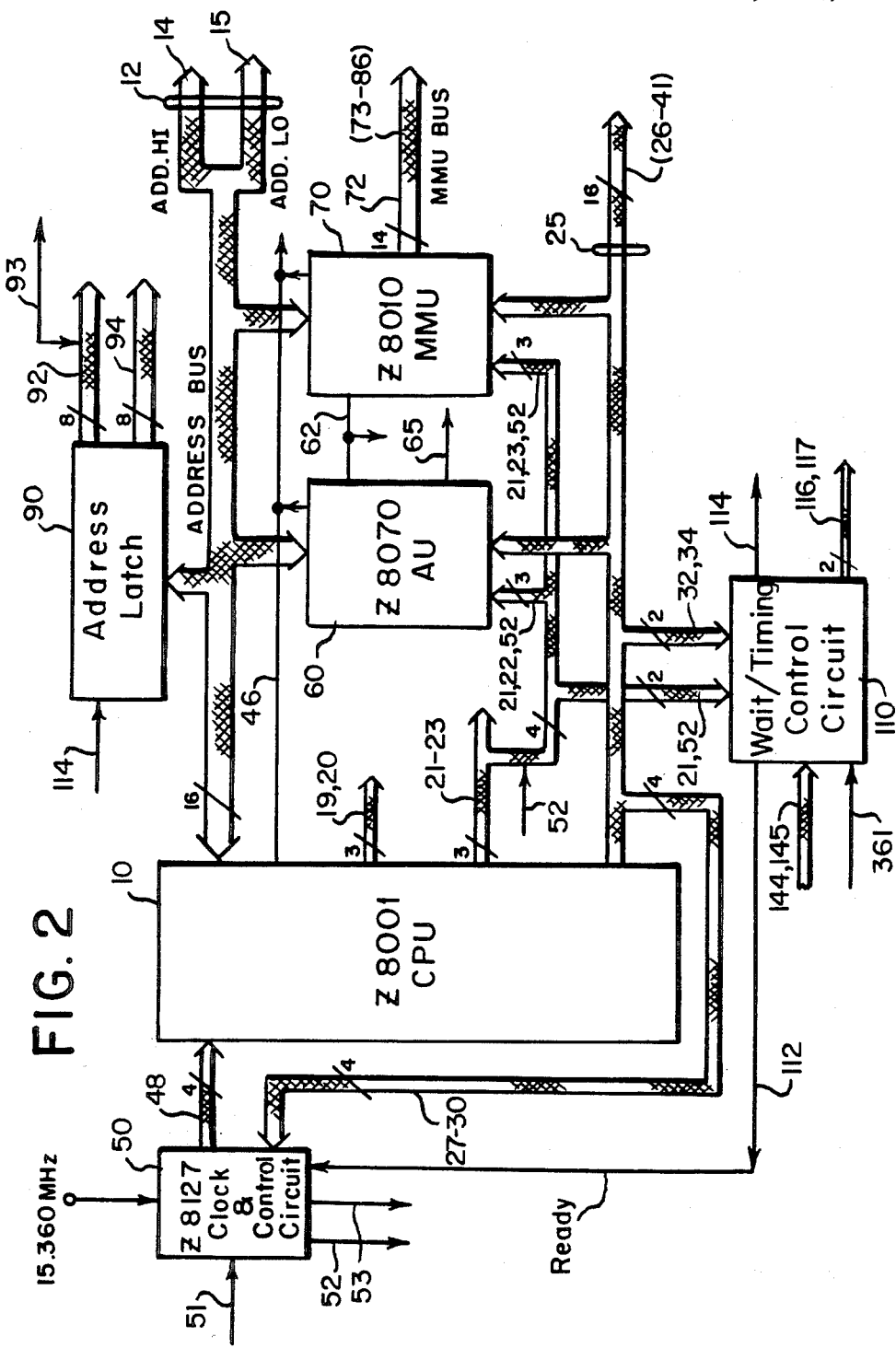
FIG. 2 depicts central processing, clock, and memory management units, together with an address latch and a wait state circuit.

The components shown in FIG. 2, provide processing, memory management, and memory and I/O timing functions for the supervisor unit. These components comprise a microprocessor CPU 10 for controlling the supervisor unit, a clock and control circuit 50 for providing clock pulse and control signals to CPU 10, a clock unit (CLK) 60 for time of day and date computing, a memory management unit (MMU) 70 for computing addresses used to access memory, an address latch 90 for storing addresses, and a wait/timing control circuit 110 for providing timing control signals to I/O and memory devices. The presently preferred embodiment utilizes components in the Z8000 chip set, but other appropriately selected and interfaced devices can be easily substituted.

Sixteen-wire address/data bus (AD bus) 12, couples together the CPU 10, CLK 60, MMU 70 and address latch 90 and conveys data and/or address information between said components. The high order eight bits of AD bus 12 comprise ADHI bus 14, and the low order eight bits comprise ADLO bus 15. CPU 10, which illustratively is a Z8001 microprocessor, receives data and instructions and provides data, addresses and control signals over AD bus 12, provides control signals over lines 19–23, couples control and status signals to 16-wire line 25 and receives control and timing signals over four-wire line 48. An interrupt signal is received by the CPU from AU 60, MMU 70, and other components of the unit over line 46.

Clock and control circuit 50 in the presently preferred embodiment is a Z8127 component driven by 15.360 MHZ source. Circuit 50 provides the Z8001 with clock pulses, wait, reset and non-vectored interrupt signals over separate wires of four-wire line 48. It receives status signals from the CPU over lines 27–30, a timing control signal from a wait/timing control circuit 110 over line 112, and a supervisor reset signal over line 51. In addition, clock pulses are applied by circuit 50 to lines and 53.

Clock unit (CLK) 60, which preferably is a 58174 component with a 74646 bi-directional latch and a 74374 control register, and a lithium battery receives instructions and data through AD bus 12, receives control signals over lines 151, 152 and 153. The CLK functions as a real-time clock and calendar which is set and interrogated with said control signals and outputs results of the current time to the AD bus. In addition, the lithium battery permits continuous operation of the 58174 clock component in the event of power failure interruption to the main supervisor unit.

Because the Z8001 CPU supports a segmented memory structure, a memory offset value from memory management unit (MMU) 70, illustratively a Z8010 device, is required to generate the actual memory access addresses. The MMU receives a 16-bit address from AD bus 12 a seven-bit segment register value from lines 35–41, and control signals from lines 26–34 of 16-wire line 25. Both the 16 bit address and seven bit value are used by the MMU to generate a 14 bit offset address which is then coupled to lines 73–86 which comprise MMU bus 71. This 14 bit address, when combined with eight bits received over ADLO bus 15, forms a 22 bit address which is used to access the supervisor memory. The MMU also applies a control signal to line 62 for use by IO/memory decode circuit 130, shown in FIG. 3.

AD bus 12 is also coupled to address latch 90, illustratively comprising two 74374 devices. When an appropriate control signal is applied to line 114 by wait/timing control circuit 110, address latch 90 accepts and stores 16 bits of address information from said bus, with the lower eight address bits being supplied to eight-wire line 92 and the upper eight bits being supplied to eight-wire line 94. Line 93 is one line of eight-wire line 92.

Wait/timing control circuit 110 illustratively comprises two 74139 decoders and a 74161A four-bit binary counter. Circuit 110 receives control signals from the CPU over lines 21, 32, 34 and receives clock pulses from clock and control circuit 50 over line 52. Memory enable and I/O enable control signals are received by the wait/timing control circuit over lines 144 and 145, respectively, from IO/memory decode circuit 130, shown in FIG. 3; and an external enable signal is supplied to circuit 110 by line 361 from a digital expansion interface 360, shown in FIG. 5. Wait/timing control circuit 110 uses control signals from lines 144, 361 and clock pulses obtained from lines 21, 32 and 34, 145 to generate a ready signal which is applied to line 112 after a period determined by said circuit. Control circuit 110 also uses control signals received from lines 21, 32, 34 and 145 to generate a control signal for latch 90 over line 114 and control signals for counter/timer/IO port 200, shown in FIG. 4, over lines 116 and 117.

Figure 3:
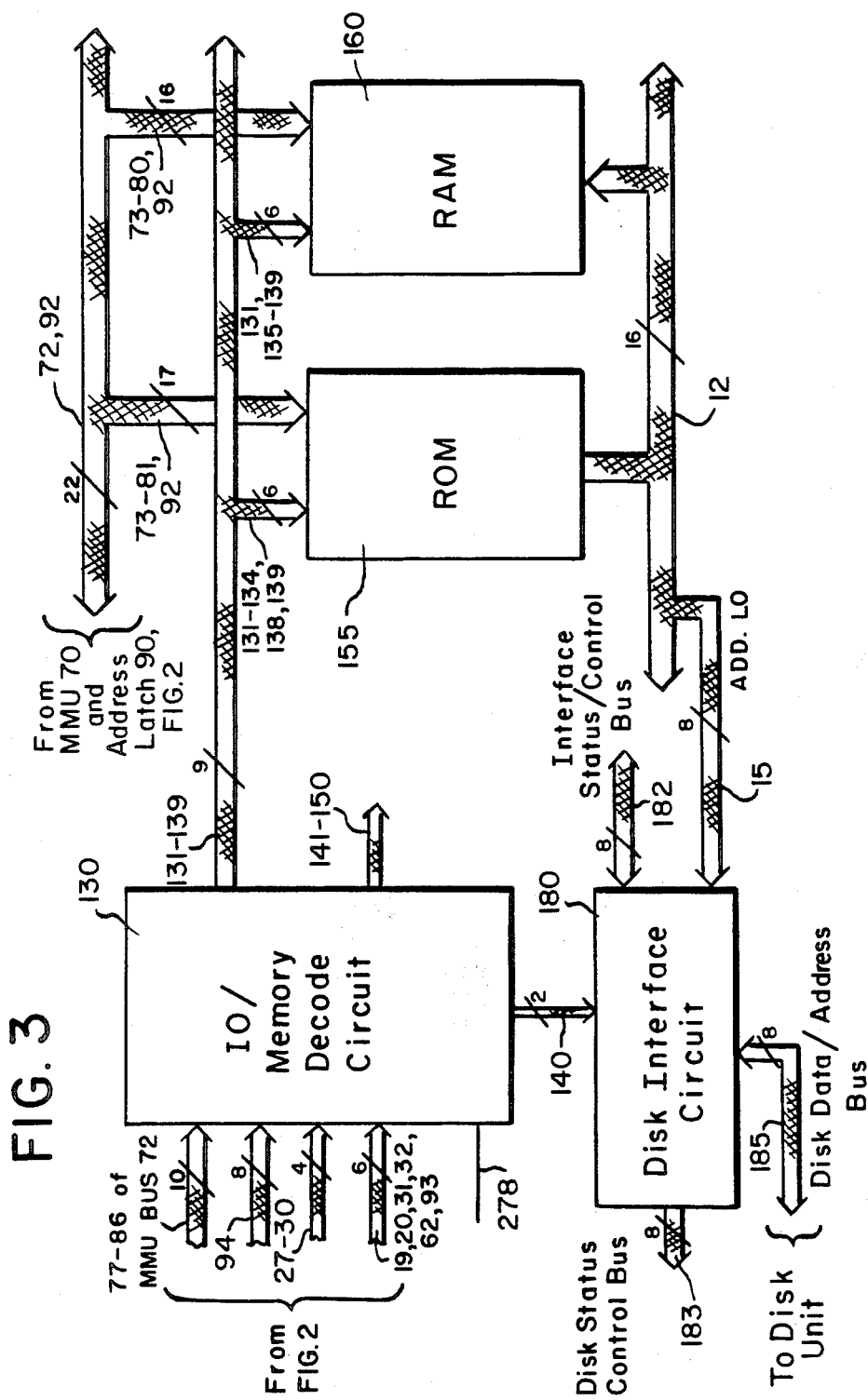

The supervisor unit also comprises IO/memory decode circuit 130, read only memory (ROM) 155, read/write memory (RAM) 160, and disk interface circuit 180 shown in FIG. 3. IO/memory decode circuit 130 receives various address, status and control signals and decodes said signals to produce I/O and memory control signals. Read only memory (ROM) provides instructions to CPU 10 and read/write memory (RAM) stores data and provides said data to the CPU. Disk interface circuit 180 permits the supervisor unit to store data on and retrieve data from a disk storage unit (not shown).

IO/memory decode circuit 130 illustratively comprises two programmable logic arrays, a 74139 dual two-to-four decoder and a 74138 three-to-eight decoder. The circuit receives 8 bits of address information from address latch 90, FIG. 2, over eight-wire line 94 and receives 10 bits of address information from MMU 70 of FIG. 2 over MMU bus lines 77–86. Control signals are also received by said decode circuit 130 through lines 27–30 and lines 19, 20, 31, 32, 62, 93 and 278. In accordance with the above-described address information and control signals, IO/memory decode circuit 130 generates memory bank select and control signals and couples them to lines 131–139 and generates disk control signals and couples them to two-wire line 140. Other control signals are generated by decode circuit 130 and applied to lines 141–153.

ROM 155 may be constructed with ordinary ROM devices, such as six 32K×8 ROM chips. The ROM is coupled to AD bus 12, eight-wire line 90 from address latch and lines 73–81 of MMU bus 72. Address information for selecting 16 bits of data or a CPU instruction from the ROM is received over said address latch and MMU bus lines. Control signals and signals for selecting ROM chips in ROM 155 are supplied by I/O/memory decode circuit via lines 131–134, 138 and 139. In accordance with said address, control and select signals, ROM 155 couples a 16 bit value to AD bus 12, whereby instructions are provided to CPU 10 of FIG. 2.

The supervisor software, which resides in ROM, includes routines for controlling TTA and testing units, for accomplishing synchronous and asynchronous communication, for performing calculations on test data provided by the testing unit, and for performing other functions. This software permits both interactive and automatic line testing. Interactive line testing is performed by an operator who, using one of the asynchronous interfaces of FIG. 4, submits various line access and testing commands to the supervisor. The supervisor unit then issues the appropriate commands to the TTA and testing unit and outputs the results of any tests performed.

Alternatively, two modes of automatic line testing are supported: selective automatic loop testing (SALT) and ordinary loop testing (ALT). SALT mode requires that an operator input a list of line numbers to be dialed and tested. The supervisor causes the TTA and testing unit to access and test every accessible line in that list, and compiles the results of these operations. ALT uses a stepper signal which is applied by the TTA unit to telephone switching equipment after a line is dialed and which permits a sequential series of lines to be accessed without having to redial each one.

RAM component 160 illustratively comprises six 8K×8 RAM devices and is coupled to eight-wire line 92, lines 73–80 of MMU bus, control lines 131 and 135–139 and AD bus 12. Eight-wire line 92, containing latched address information and lines 73–80 of MMU bus 72 are used to present a 16 bit address to the RAM. Lines 131 and 135–139 provide control and select signals, and AD bus 12 is used to convey 16 bits of data information to and from CPU 10 of FIG. 2. To read data from or write data to said RAM, an address is presented through the above-mentioned lines, appropriate control and select signals are supplied by line 131 and lines 135–139, and data is read from or coupled to the RAM over AD bus 12.

Disk interface circuit 180 provides communication between the supervisor and a disk storage unit. In the presently preferred embodiment, the interface essentially comprises two 74374 latches, a 74280 parity generator/checker device and two 7474 D-type flip-flops. ADLO bus 15, two-wire read/write disk control line 140, eight-wire interface status/control line 182, disk status/control line 183 and eight-wire disk data/address bus 185 are coupled to the interface circuit. The AD bus lines convey data between the CPU and disk interface circuit 180 and two-wire read/write disk control line 140 controls reading from and writing to said disk storage unit. Control line 182 conveys status and control signals such as parity, error and disk busy, between the interface and the counter/timer/input/output (CTIO) port 200 of FIG. 4, while disk status/control line 183 conveys said signals between the interface and a disk storage unit. Disk data/address bus 185 carries data and address information to and from said unit and interface. Illustratively, this information could include instructions for accessing a particular kind of switch, or a list of lines to be accessed via SALT, or the results of the tests performed on such lines.

Figure 4:
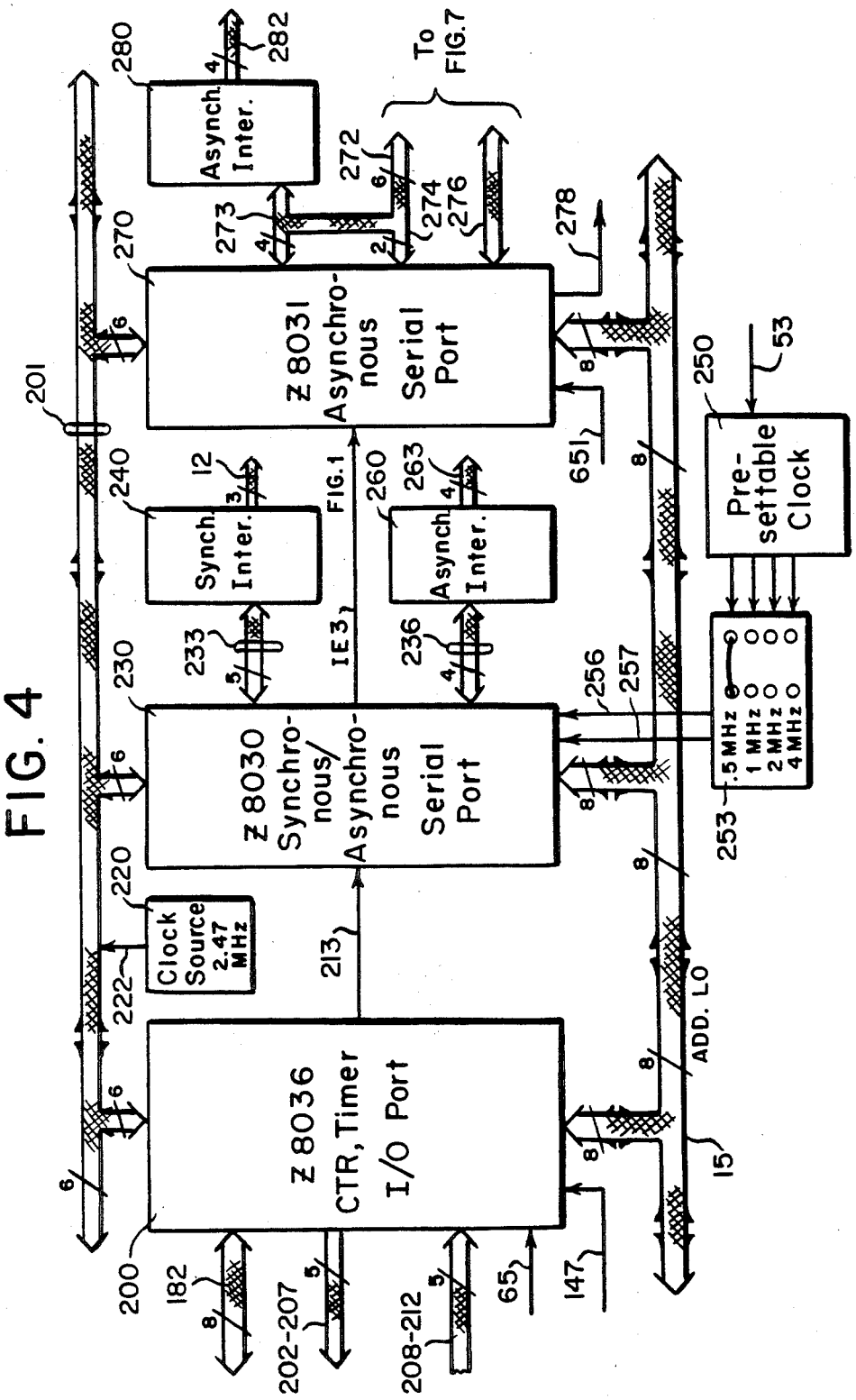
FIG. 4 illustrates a counter/timer/IO port, as well as serial synchronous and asynchronous communications components.

FIG. 4 shows components used for timing, control and communication purposes comprising CTIO port 200 for supplying timing and control signals, a clock source 220, a synchronous/asynchronous serial port 230, a synchronous interface 240, a presettable clock 250, an asynchronous interface 260 for providing synchronous and asynchronous communication, and an asynchronous serial port 270 and an asynchronous interface 280 for providing asynchronous communications.

CTIO port device 200, illustratively a Z8036 component, contains registers and counter/timer circuitry. The CTIO is coupled to ADLO bus 15, to control line 147, to disk status and control line 182, to seven-wire clock and control line 201 and control lines 202–213. Seven-wire clock and control line 201 comprises control line 31, interrupt line 46, clock line 52 and control lines 116, 117, all in FIG. 2, in addition to clock line 222, FIG. 4., and interrupt acknowledge lines 46 and 146. Line 147 is used to supply an enable signal. ADLO bus 15 conveys data and control signals between CPU 10 and CTIO port 200; disk status and control line 182 controls disk access operations implemented through disk interface 180 of FIG. 3; control line 201 provides control and clock signals to CTIO port 200 and control signals from the CTIO port to various other components; and control lines 202–207 and 208–212 convey control signals to and from IO/memory decode circuit, respectively.

To load registers in the CTIO port 200, the CPU causes control signals to be placed on lines 31, 116, 117 and 147 and control data on ADLO bus 15. Control data is thereby coupled to components shown coupled to lines 202–207 which are used as control lines. Disk status and control signals can be written to and read from disk interface 180, FIG. 3, by CTIO device 200 over line 182 with said signals being initially written to or ultimately read from the CTIO port by CPU 10 over ADLO bus 15. Also, counter/timer values can be presented to and read by the CPU using said bus and appropriate control signals on lines 31, 116, 117 and 147.

Clock pulses are provided to the CTIO port over line 52 from clock and control circuit 50, of FIG. 2 at a rate determined by that circuit, and over line 222 from clock source 220, illustratively at 2.47 MHZ. Lines 65 and 213 are used to implement a daisy chain priority interrupt scheme. Interrupt and interrupt acknowledge signals are sent and received by CTIO port 200 through lines 46 and 146, respectively.

To write to or read from a disk, address information and other information must be communicated to the disk controller (not shown) which is part of a disk storage unit. The CPU provides this information to the disk interface over ADLO bus 15, which accepts and stores the address from said bus when appropriate control signals appear on two wire read/write control line 140 and couples it one byte at a time to the controller over disk data line 185. CTIO port 200 in FIG. 4 is loaded with 8-bits of control signal data from the CPU using ADLO bus 15 and control lines 31, 116, 117 and 147. The eight control signal bits received over ADLO bus 15 include bits which inform the disk controller whether data is to be written to or read from the disk. Disk interface receives this control signal information over disk status and control line 182 and supplies it to the controller unit over disk status/control bus 183.

Data to be written to the disk is coupled by CPU over ADLO bus 15 to disk interface circuit 180, which in turn provides said data to the disk controller and storage unit over disk data/address bus 185. If data is to be retrieved from the disk, the controller causes the disk unit to read data from the disk surface, at the address provided, and transmits the data to disk interface circuit 180 over disk data/address bus 185. The interface then supplies the data to the CPU 10 over ADLO bus 15.

Synchonous/asynchronous serial port (S/AS port) 230 includes separate components utilized to perform synchronous serial communication and asynchronous communication. The S/AS port 230, illustratively a Z8030 device, is coupled to CPU 10 by ADLO bus 15 and receives clock signals over lines 52 and 222, interrupt and interrupt acknowledged signals over lines 46 and 146, baud rate clock signals over lines 256, 257 and control signals over lines 31, 116, 117 and 213. Line 147 is used to convey an enable control signal from IO/memory decode circuit 130 of FIG. 3. Lines 213 and 238 implement daisy chain prioritizing.

The synchronous portion of the port is coupled by five-wire line 233 to synchronous interface 240 which sends a message frame over line 242 and a reset signal over line 243, and receives a response frame over line 244. These lines are coupled to various testing units and TTA units and allow synchronous serial communication between said units and the supervisor unit.

Presettable clock 250 illustratively comprises three 74163A four-bit counters and a means for selecting a frequency output, illustratively using jumper connections 253. The clock source is driven by clock pulses supplied by clock and control circuit 50 of FIG. 2 over line 53. Depending upon the jumper configuration selected (0.5 MHz is shown), the clock source generates pulses at 0.048, 0.096, 1.92, or 3.84 MHz to set baud rates for said synchronous component of synchronous-/asynchronous interface 240.

The asynchronous portion of asynchronous/synchronous serial port (S/AS port) 230 is coupled by four-wire line 236 to asynchronous interface 260, as is four-wire line 263. Four-wire line 263 provides data set ready, receive data, transmit data and data terminal ready signals which permit asynchronous communication between the supervisor unit and other communications equipment, such as a terminal.

Data to be transmitted by the asynchronous or synchronous component of S/AS port 230 is provided to the port over ADLO bus 15 by the CPU which then operates control lines 31, 116 and 117. Data received by either component is placed upon ADLO bus 15 and through manipulation of the above-described control lines is transmitted to CPU 10.

Also shown in FIG. 4 is an asynchronous serial port 270, which in the presently preferred embodiment is a Z8031 device. This component is coupled to ADLO bus 15, which is used to convey data between the device and CPU 10, to lines 52 and 222 which provide clock signals, to interrupt line 46 and interrupt acknowledge line 146, to control lines 31, 116, 117, to enable line 238, to a six-wire line 272 comprising four-wire line 273 and two-wire line 274, and to six-wire line 276. Lines 238 and 278 implement daisy chaining.

An asynchronous interface 280, comprising 1488 and 1489 devices, is coupled to asynchronous serial port 270 by four-wire line 273, and provides data set ready, transmit data, receive data and data terminal ready signals over four-wire line 282 for interfacing with other communications equipment.

Six-wire line 272 is coupled to the serial data telephone interface 530 of modem "A" shown in FIG. 6, and conveys serial communications signals, such as transmit data, receive data, data terminal ready, request to send, and clear to send, as well as a command/data control signal, between the asynchronous serial port 270 and said interface 530. Similarly, six-wire line 276 is coupled to the serial data telephone interface 630 of modem "B", of FIG. 6 and is used to send and receive the above described signals to and from said interface.

Circuitry and components used to determine alarm conditions and DIP switch positions, to store modem control signals and to provide an expansion interface are shown in FIG. 5.

Alarm sense circuitry includes a 16-bit buffer 300 illustratively comprising two 74244 latch devices, which is coupled to ADHI bus 14 and ADLO bus 15 and is controlled by control line 141 from IO/memory decode circuit 130 of FIG. 3. Buffer 300 receives from DIP switch 310 12 bits of data through 12-wire line 312 and four bits of data through four-wire line 315. Sense circuit 320 preferrably comprises four LM339 operational amplifiers that are coupled by four sense lines 322 to four transducers (not shown) that monitor four environmental parameters. Tne output of sense circuit 320 is applied by four-wire sensing line 324 to DIP switch 310 from which it is applied by four-wire line 315 to buffer 300. Four-wire line 315 is also coupled to an OR gate for producing the output signal ALARM on line 212, which is in turn coupled to CTIO port 200.

When an appropriate control signal appears on line 150, buffer 300 accepts and stores 16 bits of data supplied by 12-wire line 312 and 4-wire line 315, and couples eight bits of said data to ADLO bus 15 and the other eight bits to ADHI bus 14, thus allowing CPU 10 to sample data in buffer 300. Four-wire sense lines 322 conveys alarm status information to sense circuit 320, where said circuit amplifies the sense line signals and provides them to four-wire line 324. Each of twelve switches in DIP switch 310 has a first pole coupled to +5 VDC and a second pole coupled to a different line of 12-wire line 312 while each of the four switches receiving the output of sense circuit 320 over four-wire line 315, has a first pole coupled to a different sense line of said four-wire line 324 and a second pole coupled to a different line of four-wire line 315.

Thus DIP switch 310 can be used to convey to the CPU 12 bits of information determined solely by the switch position and four bits of alarm status information determined by the values of four-wire sense line 322. In addition, OR gate 330 receives the signals from sense circuit 320 over four-wire line 315, and outputs a status signal indicating whether an alarm condition exists on line 322.

Modem/dial control latch 340 provides modem/dialing control signals to the modem circuits shown in FIG. 7 and dialing circuitry shown in FIG. 6. Latch 340 comprises two 74374 latch chips coupled to and receiving information from ADLO bus 15 and ADHI bus 14 and is operated by control signals on line 141 from IO/memory decode circuit 130, FIG. 3, and line 204 from CTIO port 200, FIG. 4. To load the modem/dial control latch, 16 bits of data are placed on ADLO bus 15 and ADHI bus 14 by the CPU, which at the same time causes appropriate control signals to be coupled to lines 141 and 204. The stored data is then applied to four-wire lines 344 and 348 and lines 351-354.

Also shown in FIG. 5 is a digital expansion interface 360 comprising non-inverting buffer/drivers and other coupling means. Each wire of ADLO bus 15, ADHI bus 14, MMU bus 72 and lines 19, 20, 26, 27-32, 34, 46, 52, 53, 62, 146, 150, 203, 278 and 361 are coupled by said interface to a line in 49-wire line 365, whereby components not described herein can readily interface with the supervisor.

FIG. 6 shows dialing circuitry using dual tone multifrequency (DTMF) and dial pulse methods and a dial tone detection circuit. The dial tone detection circuit is used to determine if the Central Office has supplied a dial tone to the line. If it has, the dialing circuitry can then access the line using DTMF or dial pulse methods DTMF dialing is accomplished by generating pairs of tones at certain frequencies, with each pair of tones representing a digit, whereas dial pulse dialing uses a series of pulses to represent digits. Circuitry for DTMF dialing comprises two-bit latch 380 for storing control signals, eight-bit latch 390 for storing digit selection data, DTMF generator 410 for supplying DTMF signals, and relay coupling circuits 420 and 430 for coupling the DTMF signals to the transmit (T) lines 422, 432 of wire pairs 421, 431 or for receiving dial tone signals from receive (R) lines 424, 434.

Two-bit latch 380 is coupled to two lines of ADHI bus 14, receives control and reset signals over lines 21 and 143, from CPU 10 and IO memory decode circuit 130 respectively, and outputs two bits of data over lines 381 and 383 which are coupled to serial data telephone interfaces 530 and 630 of FIG. 7, respectively. Eight-bit latch 390 receives control signals across lines 205 and 143 and is coupled to ADLO bus 15 and eight-wire line 393. DTMF generator 410, illustratively an MK5089 device, is also coupled to eight-wire line 393, receives a control signal through line 206, and outputs a DTMF tone on line 411. Said line is in turn coupled to relay coupling circuits 420 and 430.

Relay circuit 420 comprises a normally open contact having first and second terminals 425, 426 and a second normally open contact having first and second terminals, 427, 428 with lines 422, 424 of wire-pair 421 being coupled to said first and second contacts, respectively. Relay coupling circuit 430 is similar with lines 432, 434 of pair 431 being coupled to the first and second contacts respectively, of circuit 430. Within wire-pairs 421 and 431, lines 422 and 432 are nominally "transmit" lines and lines 424 and 434 are nominally "receive" lines. The second contact of each circuit 420, 430 selectively couples receive leads 424, 434 of wire pairs 421, 431 to line 429 to dial tone detection circuit 450. Circuits 420 and 430 are controlled using lines 351 and 352, respectively, from modem/dial control latch 340.

Dial tone detection circuit 450 is constructed using four LF 347 operational amplifiers and is coupled to lines 427, 437 and 451. The circuit examines signals supplied to it over lines 427 and 437 and outputs a status signal on line 451 from which the CPU can determine whether a dial tone is present on a telephone line.

When an appropriate latch control signal appears on line 143, latch 380 accepts two bits of data from ADHI bus and couples one of the bit values to lines 381 and the other to line 383.

Eight-bit latch 390 is loaded by CPU 10 with data from ADLO bus 15 when an appropriate control signal is presented to said latch over lines 143 and 205 and couples the data to eight-wire line 393. In response to a control signal received from CTIO port 200 over line 206, DTMF generator receives eight bits of data from said line and uses this data to select the DTMF tones to be generated.

When operated by control signals presented by lines 351 and 352, relay coupling circuits 420 and 430 couple signals from lines 424 and 434 through the second contacts in circuits 420 and 430 to line 429 to dial tone detection circuit 450. When a dial tone is detected by said circuit, a status signal is coupled to line 461. Simultaneously, circuits 420, 430 couple tones from DTMF generator 410 to lines 422 and 432, respectively.

Dial pulse circuitry comprises a dial pulse generator 460 for supplying pulses used to dial telephone lines, and a pulse/status decode circuit 470 for coupling pulses to modem "A" or modem "B" of FIG. 7 in accordance with control signals.

Dial pulse generator is coupled to eight-wire line 393, over which said circuit receives digit selection data, to control line 206 and status line 210 from CTIO port 200, and to control line 354 from dial/modem control latch 350. An appropriate control signal on line 206 causes dial pulse generator 460 to accept eight bits of digit selection data from latch 390 over eight-wire line 393 and to generate the number of dial pulses required to dial the digit specified by said digit selection data. Line 354 causes the generator to produce pulses at 20 pulses a second rather than the standard 10 pulses per second, and status line 210 applies a signal to CTIO port 200 whenever dial pulses are being generated.

The generated pulses are applied by line 463 to pulse/status decode circuit 470 which uses control signals from lines 202, 207, 351 and 352 to couple dial pulses to modem "A" or modem "B", respectively.

FIG. 7 shows modem circuitry for sending and receiving signals over telephone lines and detecting ring signals, and a relay for making a metallic coupling between an accessed phone line and a TTA unit. Two modem circuits, modem "A" 500 and modem "B" 600, are used with both of said circuits comprising virtually identical parts. For convenience, only the circuit of modem "A" will be described.

Modem "A" 500 circuitry comprises amplification circuit 510 for amplifying signals to be coupled to and received from telephone lines, a dial signal/data coupling circuit 52 for coupling signals to and extracting signals from telephone lines and for detecting a ring signal, and a serial data telephone interface circuit 530 for sending and receiving serial digital data over telephone lines.

Amplifier circuit 510 is coupled to DTMF dialing circuit 410 by wire pair 421. The output of amplifier circuit 510 is coupled by tip and ring lines 513, 514 to serial data telephone interface 530 and by tip and ring lines 516, 517 to dial signal/data interface 520. Dial signal/data interface 520 is also coupled to the tip and ring leads 522, 523 of a telephone wire pair 212 and to a status line 525, and receives a control signal over line 472.

Serial data telephone interface 530 is coupled to asynchronous serial por 270 of FIG. 4 by six-wire line 272 and receives control signals over line 381 and four-wire line 344. Clock pulses are applied to interface 530 by line 222.

The apparatus of Modem "B" is similar with tip and ring leads 622, 623 additionally coupled to relay 660, which in turn selectively capacitively couples lines 663, 664 from a TTA unit to said tip and ring leads, respectively.

DTMF tones, dial pulses or data are transmitted and received over telephone lines using the modem components shown in FIG. 7. DTMF tones, which are produced by DTMF generator 410 of FIG. 6 and coupled to amplification circuit 510, are amplified by that circuit and supplied to dial signal/data interface 520 over line 516. Also supplied to the interface are dial pulse signals over line 472. Depending upon what dialing means is used, dial signal/data circuit 430 applies DTMF tones or dial pulses to tip and ring leads 522, 523 of telephone line wire pair 521. The circuit also tests for the presence of a ring signal on a telephone line wire pair and couples a status signal to line 212 when such a signal is discovered.

Data received from asynchronous serial communication port 270 is coupled to a telephone wire using serial data telephone interface 530. This interface, illustratively an AM 7910 modem chip, sends and receives control signals and asynchronous serial data to and from said port 270 over six-wire line 272. In accordance with the above mentioned control signals, the interface converts the digital data it receives from the port to frequency modulated signals and couples said signals to amplification circuit 510 via wire pair 512. Circuit 510 amplifies the signals and supplies them to dial signal/data interface 520, and through said circuit, to tip and ring leads 522, 523 of a telephone line wire-pair 521. Similarly, data received in modulated form from the telephone line wire pair through tip and ring leads 522, 523 is coupled by dial signal/data interface 520 to amplifier circuit 510 where the modulated signal is amplified and provided to serial data telephone interface 530. The interface demodulates and converts the signal into digital form, and in accordance with control signals received over four-wire line 344, couples data to the digital data asynchronous serial port 270 over six-wire line 272.

Modem "B" is also used to permit a metallic coupling between a TTA unit and telephone lines accessed by a supervisor unit. Relay 660 is coupled to lines 662 and 663 from a TTA unit, to tip and ring leads 622, 623 of a telephone wire pair 621, and to control line 353. When an appropriate control signal is presented by line 353, relay 660 couples line wire pair 661 to wire pair 621, thus forming a metallic coupling between the telephone line and a TTA unit.

While the invention has been described in connection with specific embodiments, it is evident that numerous alternatives, modifications, and variations will be apparent to those skilled in the art in light of the foregoing description.

What is claimed is:

1. An apparatus for testing and maintaining communication systems comprising:
    bi-directional data channel means;
    means for accessing communication lines comprising a first microprocessor for controlling said accessing and a first input/output means for sending requests and data and receiving instructions and data over said data channel means;
    means for testing lines accessed by said accessing means so as to obtain values from which electrical and noise characteristics can be derived comprising a second microprocessor for controlling and testing and a second input/output means for sending requests and data and receiving instructions and data over said data channel means;
    means for controlling said first and second microprocessors comprising a third microprocessor and input/output means for sending instructions and data to, and receiving responses and data from, said accessing and testing means over said data channel means;
    whereby line accessing, line testing and supervisory functions are distributed among cooperating testing, accessing and controlling means.

2. The apparatus of claim 1 further comprising means for interfacing said controlling means to a communication line to receive instructions concerning tests to be performed by said apparatus and/or to transmit results of tests performed by said apparatus.

3. A method of testing and maintaining communication systems comprising the steps of:
    accessing communication lines with an accessing means having a first microprocessor for controlling said accessing and a first input/output means for sending requests and data and receiving instructions and data over bi-directional data channel means;
    testing the lines accessed by said accessing means so as to obtain values from which electrical and noise characteristics can be derived, said testing being performed with a second microprocessor for controlling said testing and a second input/output means for sending requests and data and receiving instructions and data over said data channel means;
    controlling said first and second microprocessors with a third microprocessor and input/out means for sending instructions and data to, and receiving responses and data from said first and second microprocessors over said data channel means;
    whereby line accessing, line testing and supervisory functions are distributed among cooperating first, second and third control means.

4. An apparatus for testing and monitoring communication systems comprising:
    bi-directional data channel means;
    a plurality of accessing units for accessing communication lines where each said unit includes a first microprocessor for controlling said accessing, and first input/output means for sending requests and data and receiving instructions and data over said data channel means and a test path means for coupling accessed lines thereto;
a plurality of testing units for testing communication lines where each said unit includes a second microprocessor for controlling said testing and second input/output means for sending requests and data and receiving instructions and data over said data channel means and means for coupling to at least one of said accesing units via said test path means; and
supervisory means for controlling said accessing and testing units.

5. The apparatus of claim 1 wherein the controlling means comprises means for directing the accessing means via the data channel means to access a communication line, the accessing means comprises means for informing the controlling means via the data channel means that it has accessed the communication line, the controlling means comprises means for directing the testing means via the data channel means to test the communication line accessed by the accessing means, and the testing means comprises means for testing the communication line via the data channel means and for reporting results of its testing via the data channel means to said controlling means.

6. The apparatus of claim 5 wherein the controlling means further comprises means for communicating the testing results to another location.

7. The method of claim 3 wherein said controlling step further comprises the steps of:
directing the accessing means via the data channel means to access a communication line,
upon receiving a report via the data channel means that the accessing means has accessed the communication line, directing the testing means via the data channel means to test the communication line accessed by the accessing means and
receiving via the data channel means from the testing means a report of the results of its testing of the communication line.

8. The method of claim 7 wherein the controlling step further comprises the step of communicating the testing results to another location.

* * * * *